US012683371B1

(12) United States Patent
Capozzi

(10) Patent No.: US 12,683,371 B1
(45) Date of Patent: Jul. 14, 2026

(54) JUNCTION BOX DEVICES, SYSTEMS AND METHODS FOR CLOSURE

(71) Applicant: RSTC Enterprises, Incorporated, Eau Claire, WI (US)

(72) Inventor: Stephen Capozzi, Eau Claire, WI (US)

(73) Assignee: RSTC Enterprises, Incorporated, Eau Claire, WI (US)

( * ) Notice: Subject to any disclaimer, the term of this patent is extended or adjusted under 35 U.S.C. 154(b) by 177 days.

(21) Appl. No.: 18/515,786

(22) Filed: Nov. 21, 2023

Related U.S. Application Data

(63) Continuation-in-part of application No. 18/054,753, filed on Nov. 11, 2022, now Pat. No. 11,862,954.

(51) Int. Cl.
*H02G 3/08* (2006.01)
(52) U.S. Cl.
CPC .................................... *H02G 3/081* (2013.01)
(58) Field of Classification Search
CPC ............ H02G 3/08; H02G 3/081; H02G 3/14; H05K 5/00; H05K 5/502; H01R 13/46; H01R 13/52; H01R 13/5213

USPC ... 174/50, 520, 559, 17 R, 66, 67, 480, 481, 174/560, 53, 57, 58; 220/3.2–3.9, 4.02; 361/600, 601, 679.01
See application file for complete search history.

(56) References Cited

U.S. PATENT DOCUMENTS

| | | | | |
|---|---|---|---|---|
| 9,496,697 | B1 * | 11/2016 | Wentworth | ............ H02G 3/088 |
| 10,230,227 | B1 * | 3/2019 | Wade | ........................ H02G 3/14 |
| 10,505,354 | B2 * | 12/2019 | Wade | ..................... H02G 3/081 |
| 10,594,121 | B2 * | 3/2020 | Yang | ...................... H02G 3/088 |
| D917,400 | S | 4/2021 | Wade et al. | |
| 11,515,693 | B2 | 11/2022 | Wade et al. | |
| 11,695,261 | B2 | 7/2023 | Wade et al. | |
| 12,142,902 | B2 * | 11/2024 | Affentranger, Jr. | .... H02G 3/088 |

* cited by examiner

*Primary Examiner* — Angel R Estrada
(74) *Attorney, Agent, or Firm* — Anthony J. Bourget

(57) ABSTRACT

Junction box devices, systems, and methods including a base and a wall extending upward from the base to define a housing having a top opening, and a lid configured to slide in a first direction along the wall to secure the lid into a closed position upon the wall and defining a gap between the wall and lid configured to receive a spacer to prevent the lid from sliding in an opposite direction, and in other aspects the junction box having pins which slide within grooves of a lid to be slid upon the pins to secure the lid to the box.

29 Claims, 18 Drawing Sheets

JUNCTION BOX DEVICES, SYSTEMS AND METHODS FOR CLOSURE

CROSS-REFERENCE TO RELATED APPLICATION

The present application is a continuation-in-part of, and claims priority to, co-pending U.S. patent application Ser. No. 18/054,753, filed Nov. 11, 2022 which is hereby incorporated by reference as if fully reproduced herein.

BACKGROUND OF THE INVENTION

Junction boxes are used to house electrical wires in a central location and for connecting a variety of wires and electrical components. Some junction boxes are used outdoors and prevent water from penetrating the structure while being readily accessible so that work may be performed within the box. Some examples of junction boxes for which patents have been granted include U.S. Pat. Nos. 9,819,166, 7,626,118, 6,942,189, to Capozzi and others. While such devices have many benefits, there is room for improvement.

SUMMARY OF THE INVENTION

Junction boxes having a lid which covers a housing are used in several applications, including for placement of the junction box on a roof for housing electrical wires and components of a solar powered energy generation system or other applications. Often a junction box includes a base which slides under flashing or shingles of a roof or other structure, while a central opening in the box receives wires or components of the system to be connected. The lid is secured by drilling or screwing fasteners through the lid and into the walls of the junction box. An installer of the junction box will typically use several screws to secure the lid to the box. Aligning the box and drilling or screwing several fasteners, can be time consuming and cumbersome, especially where the installer must match hardware to proper positions on the junction box, may drop fasteners or washers or other hardware during the assembly or installation, among other efforts needed for the installation. If some hardware is forgotten, the integrity of the junction box might be jeopardized. Once installed, the lid is removed by unscrewing the several fasteners to gain access to the housing, and the several fasteners are collected or retained so the lid may be reset after use. These aspects of installation and use of numerous fasteners, components and steps to secure the lid have heretofore not been thought of as a problem but have simply been accepted as a way of life or as just part of the overall use or installation process of a junction box. The present inventor, however, has developed a better junction box which eliminates or reduces these otherwise accepted problems which have not been recognized previously or considered simply as a part of the job. In one aspect the present invention presents an easy to install and use junction box by utilizing a lid configured to slide along a wall of a junction box to cover a top opening of the box and to secure the lid into a closed position. The sliding of the lid effectively locks the lid into position without the need for an installer to drill or screw a fastener through the lid. A spacer may be used to fill a gap between the lid and the wall of the junction box to prevent the lid from sliding in a reverse direction. In aspects the spacer may be a fastener which installs through the lid to contact the wall, and in other aspects the spacer is friction-fit into the gap between the lid and wall. In a further aspect the wall includes a pin which is received within a slot of the lid. In yet a further aspect the wall includes a slot which receives a pin projecting inward from the lid. In further aspects a pair of pins cooperate with a pair of angled slots to secure the lid to the wall.

In further aspects the invention includes a junction box having a lid with a slot which receives a pin secured to the wall where the pin slides within the slot. As the lid slides, the pin progresses along the slot which slot is ramped or angled so that the lid firmly sets upon the junction box and cannot be removed unless the lid is slid in an opposite direction. A friction fit spacer may be introduced in a space between the lid and the wall. If desired, a single fastener may be secured through the lid into communication with the wall to prevent the lid from sliding and otherwise secure the lid to the junction box.

In further aspects the invention includes a junction box having a wall extending upward from a base, the wall having a slot configured to receive a pin secured to a lid which aligns over the wall. As the lid slides, the pin progresses along the slot which slot is ramped or angled so the lid firmly sets upon the junction box and cannot be removed unless the lid is slid in an opposite direction.

In further aspect the invention includes a method of securing a lid to a wall of a junction box having a wall. A step of the method includes sliding a lid upon a wall of the box in a first direction into a closed position. In the closed position the lid in part defines a gap. A further step includes providing a spacer in the gap which prevents the lid from sliding in an opposite direction to lock the lid to the wall.

In further aspects the invention addresses problems with securing a junction box underneath shingles of a roof to which the junction box is applied. Shingles are commonly nailed into position. Often the installation of a junction box requires sliding the base or flashing of the junction under a shingle or flap of a shingle or several shingles (and typically sliding the shingle upward along the sloped roof) which shingles are already secured to the roof or structure. Applicant has appreciated that the sliding action often results in the flashing or base of a junction box abutting against the nails or other fasteners securing the shingles to the structure. The removal of nails to allow sliding in place of the flashing may result in disruption of the water sealing features of the shingles, torn or damages shingles, removal of nail and resulting holes in the structure, increased labor to remove the nails and lift the shingles to insert the flashing or base of the junction box, and subsequent adjustment of the flashing under the shingles among other drawbacks. Heretofore users have not necessarily appreciated such difficulties and efforts as problems but more of a fact of the installation effort. In accordance with the invention, the flashing or base of the box component of the junction box is configured with a relatively narrow profile to accommodate ease of sliding the flashing underneath shingles to avoid or lessen the amount of contact with shingle nails. In aspects the narrowing of the profile is accomplished by using clipped corners of the base such that upper areas of the base (which are inserted underneath the shingles) are angled toward a centerline of the base to allow for clearance from nails or from a greater number of nails. The narrowed profile also allows for reducing the sharpness of corners that are inserted under the shingle and allows the user to promote insertion of the flashing by twisting or adjusting the flashing upward and beneath the shingles (and to assist in separating the shingles from lower shingle or roofing materials for easier insertion of the junction box). The clipped or narrowed areas (devoid of flashing) also accommodate for subsequent nailing of shingles along a narrower span (at those devoid areas) to better secure shingles into position.

In further aspects the invention addresses problems with a lid used in conjunction with the junction box including improving the strength of the lid, safety, and promoting dissipation of water or snow away from the housing. In accordance with the invention the lid includes a perimeter edge in the form of a flared or tapered edge or rib which lends structural strength to the lid, a gradually sloped grasping component for a user and promotes dissipation of precipitation outward from the box component. The rib is located at a terminal portion of a panel which extends downward from a top portion of the lid and aligns substantially around the entire perimeter of the downward extending panel. In further aspects the rib includes rib gaps or spaces to accommodate insertion and removal of hardware and increases the strength of the lid at key areas of use, and such gaps operate as receiving ports for ease of use and assembly of the junction box.

In further aspects the invention addresses problems with easily securing and removing the lid from the box component, including problems with having a reliable fastener together with accommodating use of a junction box without the user having to install any hardware yet provide a reliable locking and unlocking mechanism which is code compliant and easy to use. In aspects the invention includes a lid and base structure where removal/detachment of the lid is accomplished by merely loosening a single fastener and sliding the lid, and where attaching/locking the lid to the base component is accomplished simply by sliding the lid upon the base component and turning a single pre-set screw to abut the base component.

The above partial summary of the present invention is not intended to describe each illustrated embodiment, aspect, or every implementation of the present invention. The figures and detailed description and claims that follow more particularly exemplify these and other embodiments and further aspects of the invention.

Figure 1:
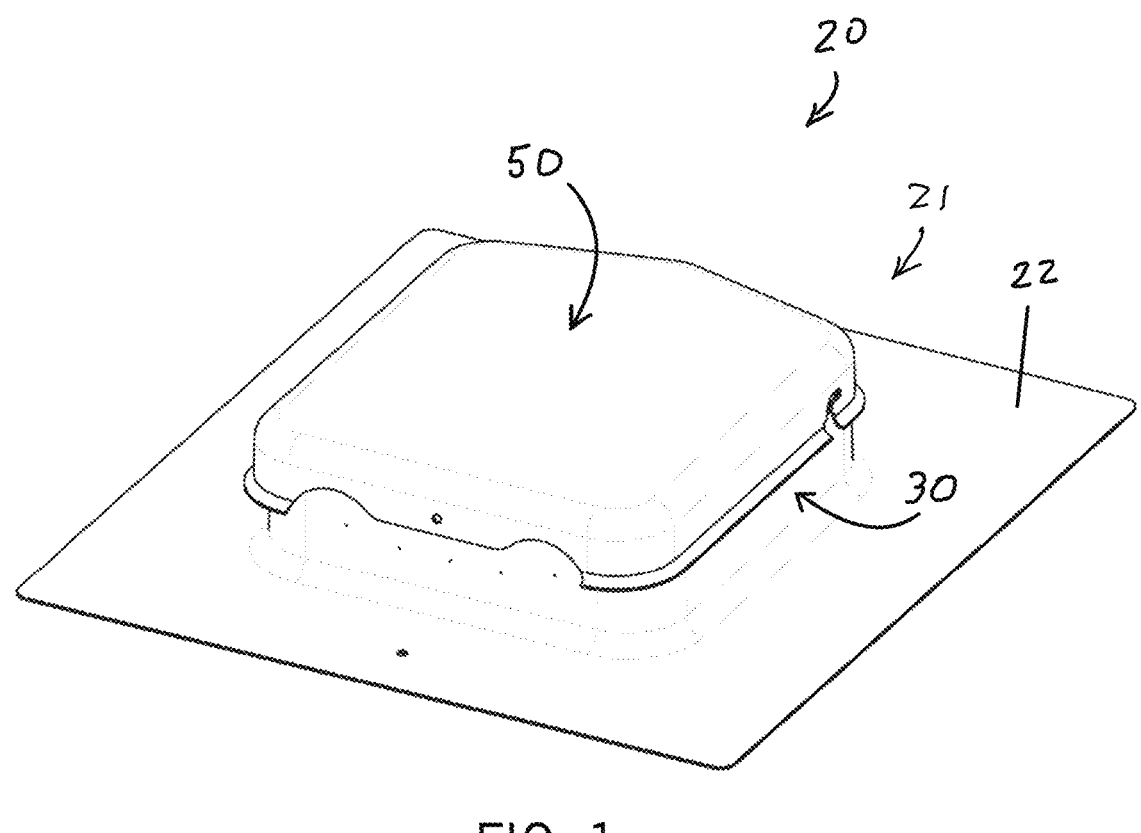
FIG. 1 is a perspective view of a junction box in accordance with one aspect of the invention.

While the invention is amenable to various modifications and alternative forms, specifics thereof have been shown by way of example in the drawings and will be described in detail. It should be understood, however, that the intention is not necessarily to limit the invention to the particular embodiments, aspects and features described. On the contrary, the intention is to cover all modifications, equivalents, and alternatives falling within the spirit and scope of the invention and as defined by the appended claims.

DETAILED DESCRIPTION OF THE INVENTION

Referring to FIGS. 1-22 aspects of the junction boxes, systems and methods of the invention are shown. In one aspect FIG. 1 shows junction box 20 which includes a base 22 having a box component 21 from which a wall 30 extends upward. The wall 30 defines a housing 40 in which wires and components may be positioned. Housing 40 has a top opening 42 for access. A lid 50 is positioned on the wall of the box component 21 and covers the top opening 42. In some aspects housing 40 has an open bottom or bottom opening 44 so that wires and components may readily extend into the housing 40 from below.

In one aspect wall 30 includes a pin 31 which extends outward from an outer surface of the wall 30. Pin 31 is received by a slot 70 defined by the lid 50. Lid 50 sets upon wall 30 such that slot 70 receives pin 31. While lid 50 moves downward upon junction box 20, pin 31 slides within slot 70. As described below, slot 70 is configured such that pin 31 secures lid 70 to the box 20.

Lid 50 has a top portion 52 and a panel 54 extending downward from the top portion 52. Lid 50 is sized to fit over the top opening 42. Panel 54 extends downward to cover at least a part of the outer surface of the wall 30 when the lid 50 is positioned on the wall 30. In one aspect panel 54 includes a first portion 55 which defines slot 70 which receives pin 31 when lid 50 is placed on wall 30. Panel 54 may also include a second portion 56 which defies slot 72 which receives pin 33 when lid 50 is placed on wall 30. In aspects panel 54 also includes a third portion 57 which extends between first portion 55 and second portion 56. Panel 54 may also include a fourth portion 58 and fifth portion 59.

Figure 2:
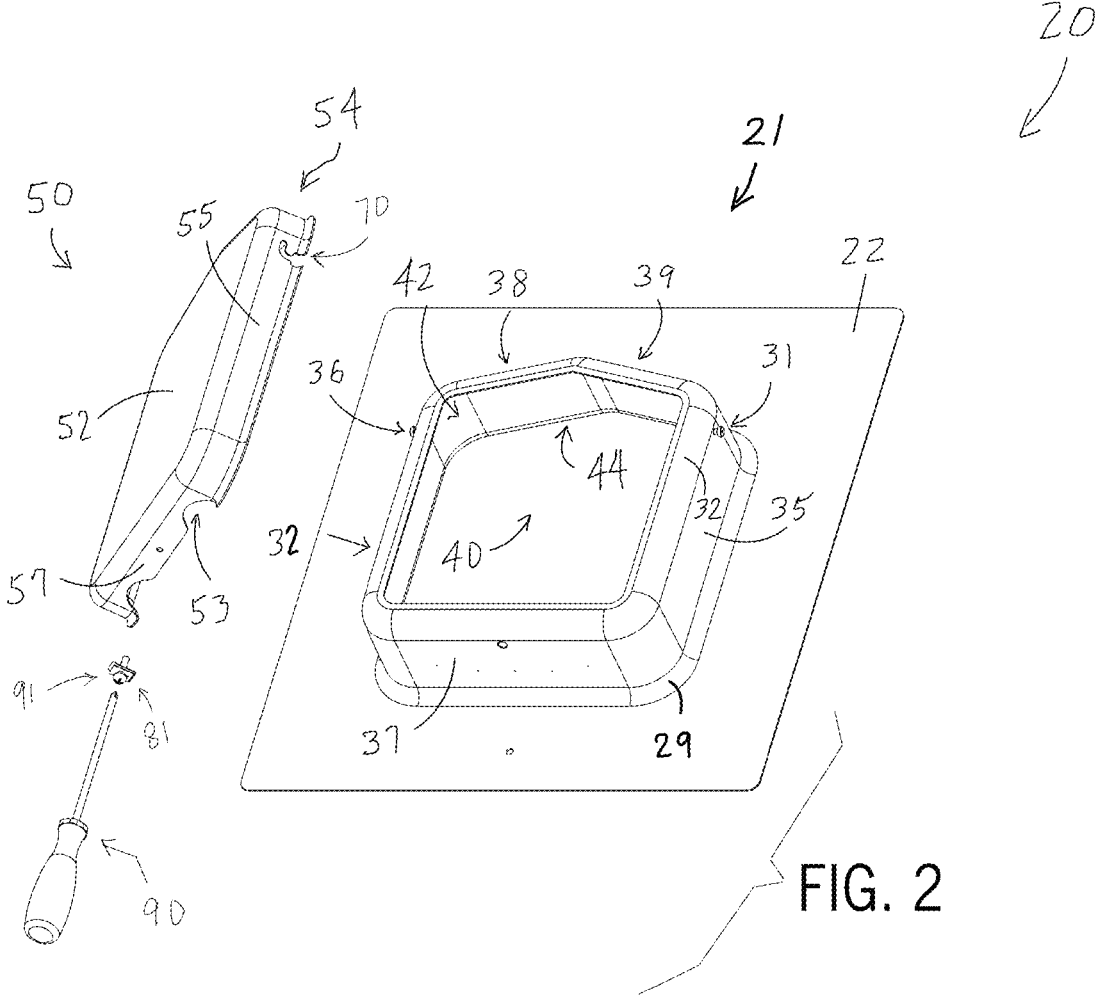
FIG. 2 is an exploded view of the junction box of FIG. 1.
Figure 3:
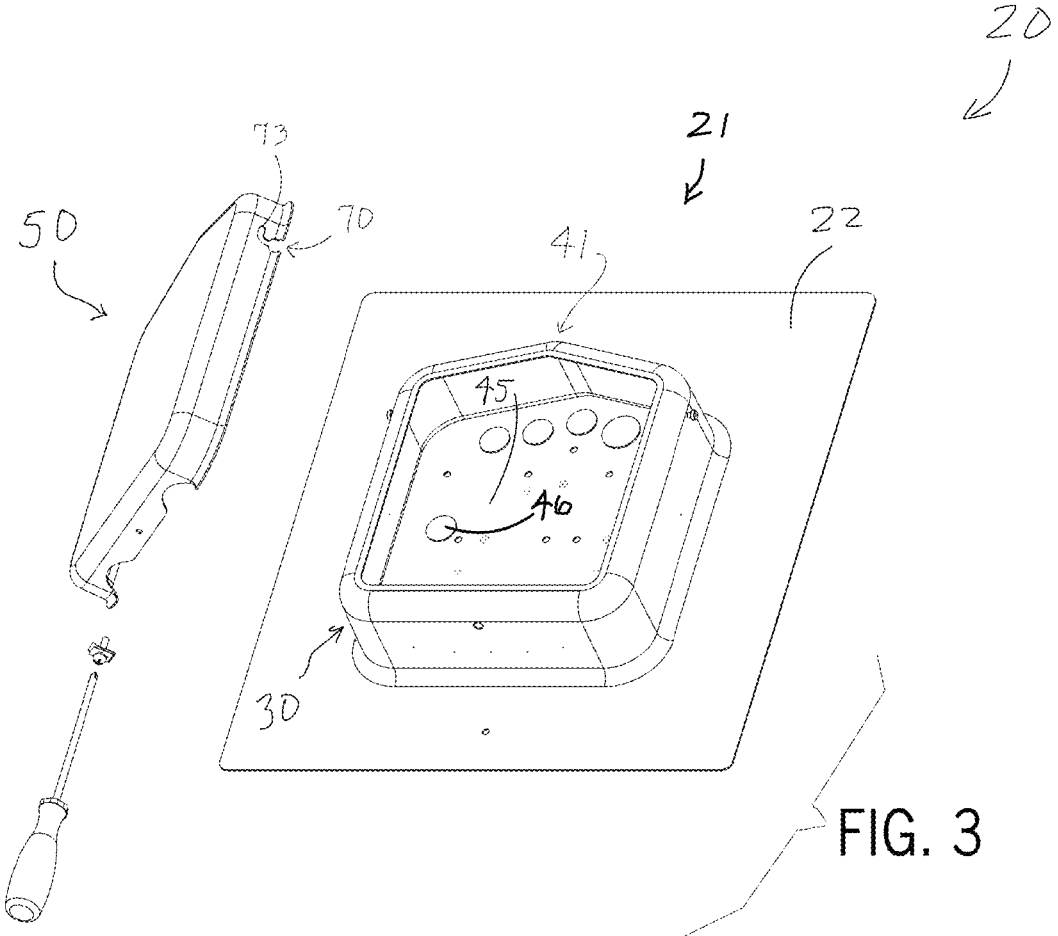
FIG. 3 is an exploded view of a junction box in accordance with a further aspect of the invention.
Figure 4:
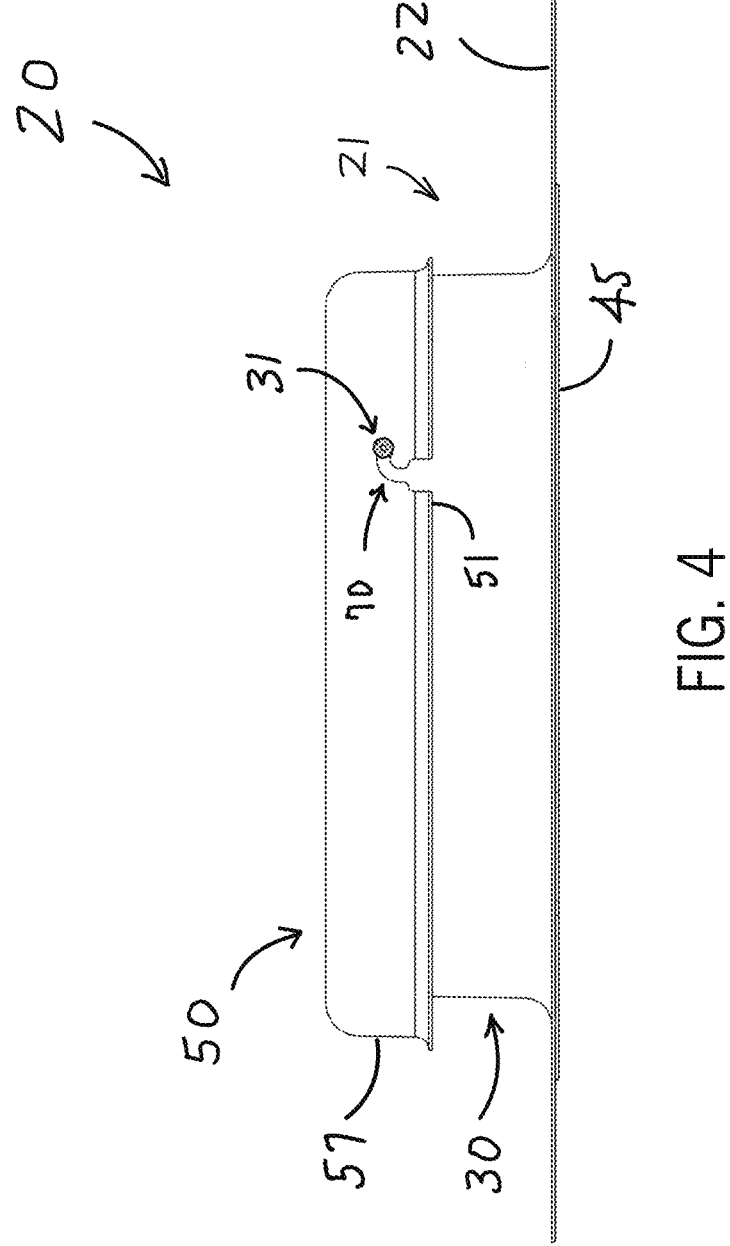
FIG. 4 is a side view of the junction box of FIG. 1.

FIG. 2 is an exploded view of junction box 20 showing lid 50 separated from wall 30 of box component 21. When lid 50 is positioned on wall 30, first portion 55 corresponds with first side 35 of wall 30, second portion 56 with second side 36 of wall 30, third portion 57 with third side 37 of wall 30, fourth portion 58 with fourth side 38 of wall 30 and fifth portion 59 with fifth side 39 of wall 30. In one aspect fourth side 38 and fifth side 39 form a peak 41. Lid 50 also includes a peak 41 defined by fourth portion 48 and fifth portion 59. Sides 38 and 39 are generally angled with respect to third side 37 and encourage water to run off sides 38 and 39. Generally the sides 35-39 of wall 30 form a perimeter around or define housing space 40. The sides 35-39 may include rounded or tapered upper areas to receive corresponding rounded or tapered areas of the underside of lid 50. In aspects the wall 30 may be circular or cylindrical or oblong or other shape to receive a corresponding lid 50. FIG. 2 shows junction box 20 where hosing 40 does not include a bottom but has a bottom opening 44. FIG. 3 shows junction box 20 having a bottom 45. Wires and components may be connected to bottom 45. In one aspect, bottom 45 is integrally connected to base 22. In other aspects, as shown in FIG. 4, bottom 45 is connected to base 22. In aspects junction box 20 may be manufactured from plastic including but not limited to hardened plastic, PVC, or other plastic material, or from metal, including but not limited to steel, stainless steel, aluminum, iron, or other metal, or of hybrid materials including but not limited to carbon fiber or alloys or fiberglass reinforced materials. In one aspect bottom 45 is integrally connected as part of base 22 as a single layer. In other aspects bottom 45 is connected to base 22. Bottom 45 may be connected by welding, gluing, friction fit, adhesives, bonding or other connecting means.

In one aspect lid 50 has a width of about 9.45 inches and a length of about 10.95 inches. In one aspect wall 30 includes a shoulder 32 which aligns around the wall 30 and forms the top opening 42. Shoulder 32 is a curved section which projects from wall 30 into the central area of housing 40. In one aspect top opening 42 has a size of about 80 square inches. Other sized openings may be used as desired. In one aspect junction box 20 has a height of about 3.15 inches when lid 50 is positioned upon wall 30. In one aspect about 1.7 inches of the wall 30 is exposed below the lid 50 when lid 50 is positioned upon wall 30. In this manner the 1.7 inches is sufficient clearance for drilling holes into wall 30 for insertion of conduits into junction box 20 if desired. Having about 1.7 inches of exposed wall 30 allows for use of a ¾ inch drill and conduit to be inserted into box 20 without having to drill into lid 50 if desired. Lid 50 also includes clearances 53 to allow for convenient drilling of holes into wall 30 and fitting of conduit into junction box 20 without having to also drill into lid 50. In one aspect base 22 has a length of about 17.25 inches and a width of about 15.75 inches which accommodates for base 22 to slide under shingles or other roofing materials. In aspects, preset knockouts 46 or knockout areas are provided (in the bottom 45 and/or wall 30) for ease of use and to assure alignment of knockout holes with aspects of the lid as noted below. Knockouts 46 in some cases are scored or semi perforated portions of wall 33 which still seal housing 40 and may be removed or punched-out or knocked-out, to expose a resulting hole. In other aspects, a smaller version of box 20, 20' (i.e., scaled down yet having proportional dimensions) may be used as noted below.

Figure 5:
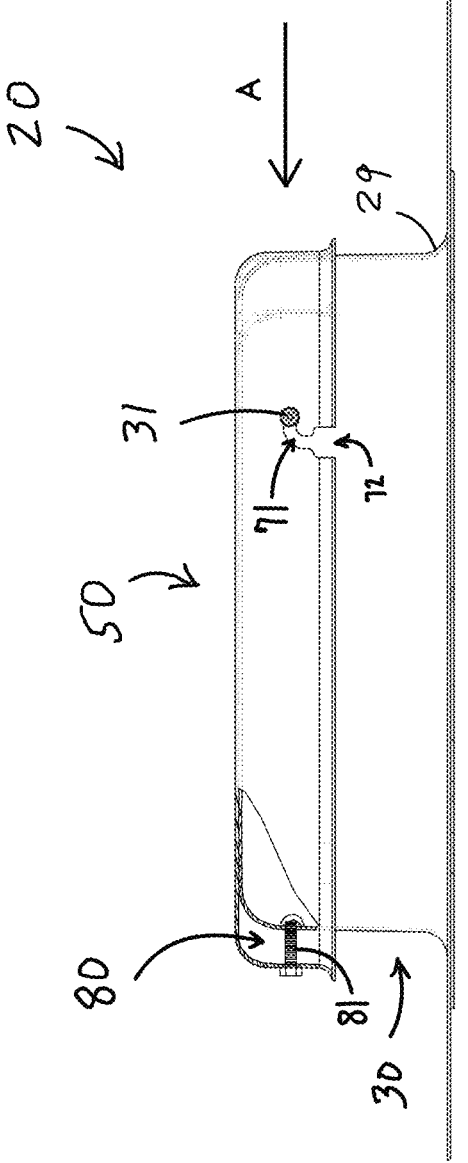
FIG. 5 is a side view of the junction box of FIG. 1 with portions removed for clarity.

FIG. 4 and FIG. 5 are side views of junction box 20 with lid 50 secured at wall 30. As shown in FIG. 5, lid 50 is configured to slide along wall 30 in the direction of Arrow "A" into a secured position. Slot 70 originates at an edge 51 of lid 50 and projects upward toward top portion 52. After projecting upward toward top portion 52, slot 70 transitions and forms a path in a direction aligned generally along edge 51 of lid 50. In one aspect, slot 70 defines a "j" shaped path or an upside-down or inverted "J" shaped path, herein collectively considered "J-shaped". In one aspect, slot 70 transitions and forms a path 71 in a direction away from a lower portion of panel 54, such as third portion 57, and in a direction opposite Arrow "A". Having slot 70 with a terminal end 73 of its path 71 in direction opposite Arrow "A" allows for pin 31 (or a shank of pin 31) to bottom-out or contact against lid 50 within slot 70 when lid 70 is slid in the direction of Arrow A. In one aspect, path 71 makes a right angle with respect to the opening or beginning at a widened portion 72 and the terminal end 73 of path 71. In operation, lid 50 is placed downward upon wall 30 such that pin 31 is received in slot 70 at opening or widened portion 72 of slot 70. The downward motion allows lid 50 to set upon wall 30, and the sliding motion allows lid to be secured into position such that lid 70 is unable or at least somewhat limited from being rotated upward from wall 30. Thus, lifting of lid 50 will not result in removal because pin 31 inhibits upward translation of lid 50 when pin 31 is positioned in the slot 70 adjacent a terminal end 73. Unless lid 50 is slid in a direction opposite Arrow A, lid 50 is locked onto wall 30. In aspects, when lid 50 is set into position as shown in FIG. 4 and FIG. 5, fourth portion 58 and fifth portion 59 (See FIG. 6) are positioned against wall 30 at fourth side 38 and fifth side 39.

Figure 15:
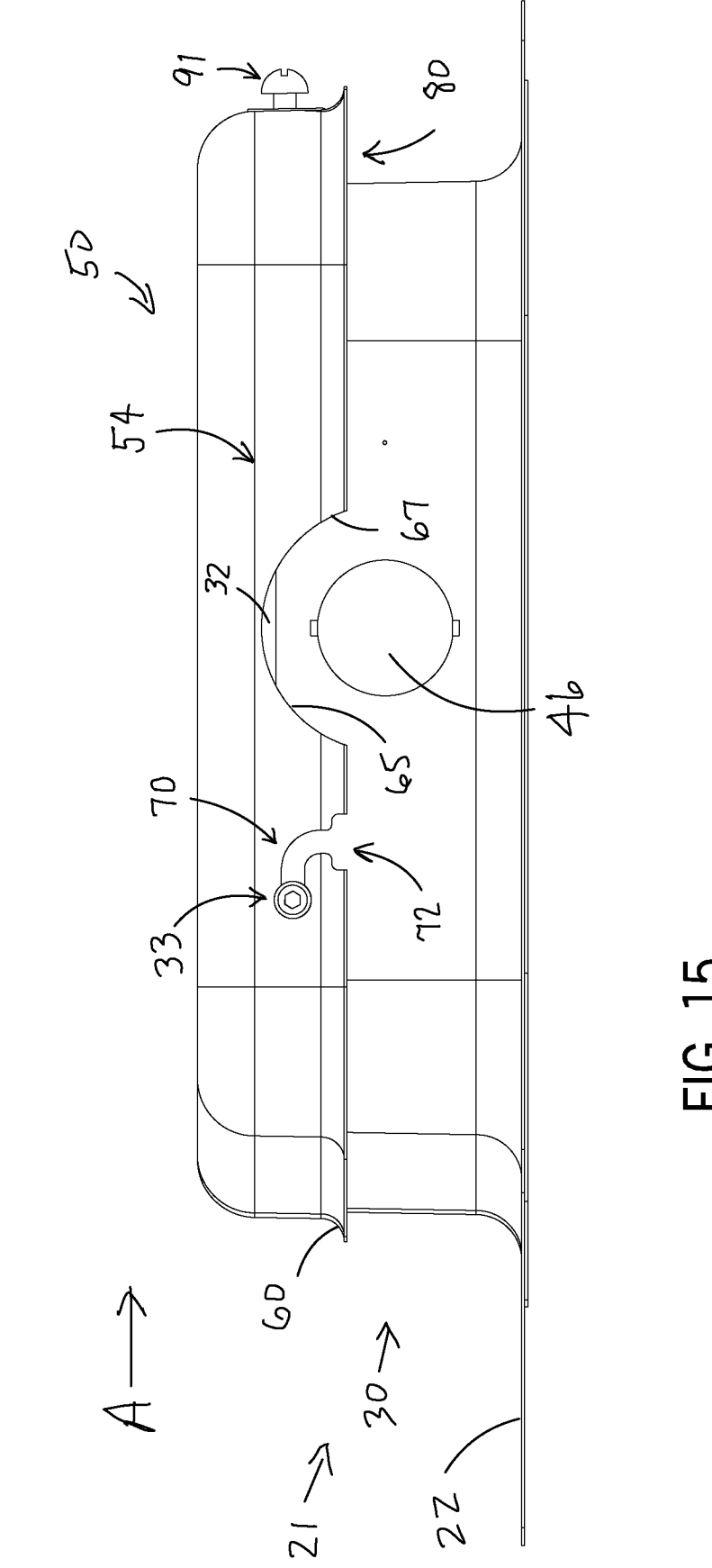
FIG. 15 is a left side view of the junction box and box component of FIG. 13.
Figures 19, 20:
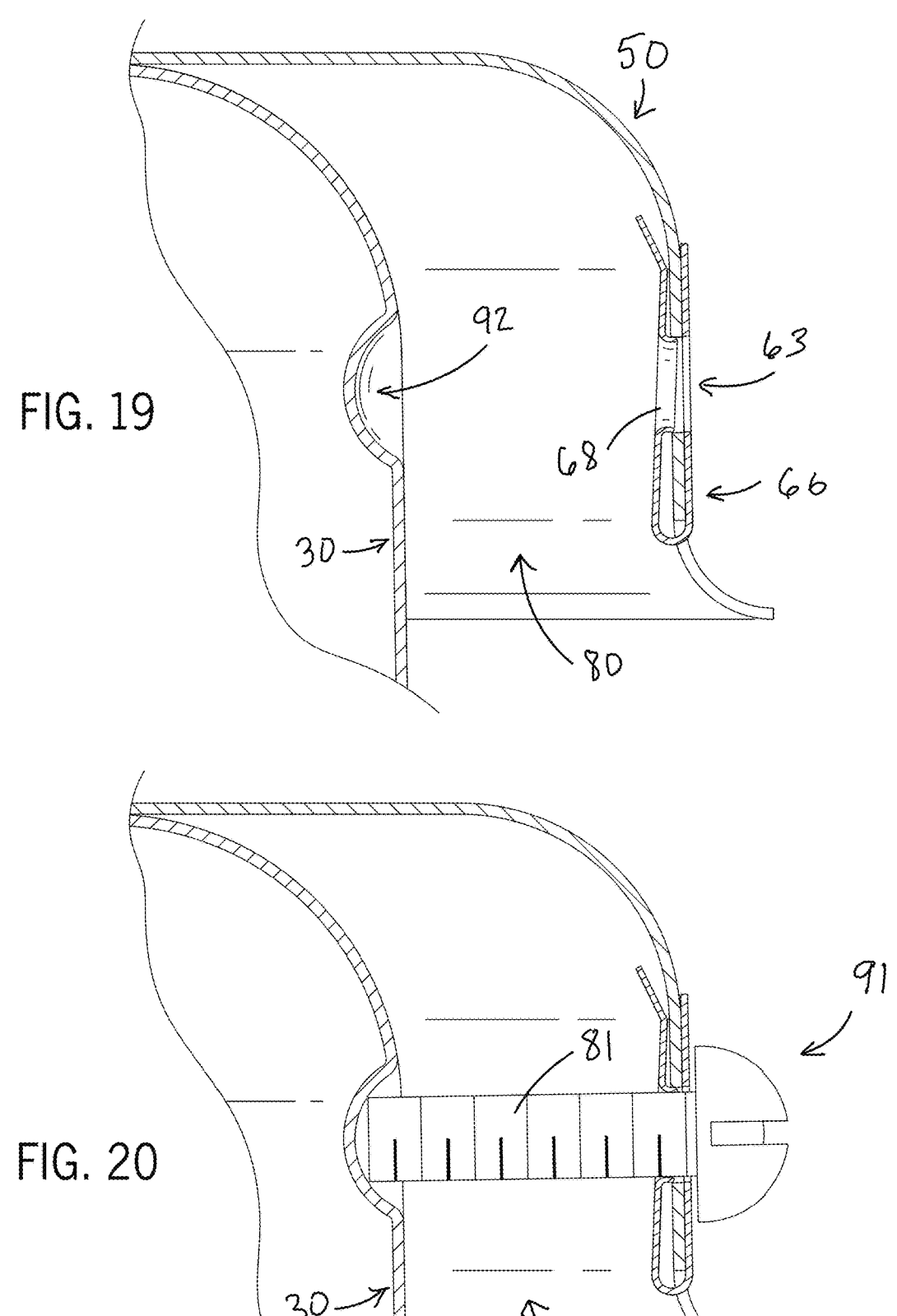
FIG. 19 is a section view taken along line 19-19 of FIG. 17.
FIG. 20 is a section view taken along line 20-20 of FIG. 18.

In further aspects, when lid 50 is set into position as shown in FIG. 4 and FIG. 5, lid 50 and wall 30 define a gap 80 (See also FIGS. 15, 19, 20). Gap 80 is configured to receive a spacer 81 to prevent lid 50 from sliding in a direction opposite Arrow A, thereby locking lid 50 to wall 30. In one aspect spacer 81 is a fastener such as a screw or other fastener which is positioned within gap 80. In other aspects spacer 81 is a fastener such as a screw or other fastener which passes through lid 50 and communicates with wall 30. Spacer 81 may communicate with wall 30 by contacting wall 30 or passing into or through wall 30. Spacer 81 may be threaded and insert into corresponding threads at wall 30. Spacer 81 may also be a self-tapping fastener which may be drilled or screwed through lid 50 and into wall 30. Wall 30 may include a preset hole for receiving spacer 81. Lid 50 may also include a preset hole to receive spacer 81. As shown in FIG. 2 and FIG. 3, an installer may utilize a tool 90 such as a screwdriver to screw or adjust or turn a spacer or fastener 91 through lid 50 and into wall 30. (See also, FIGS. 16-20). The spacer or fastener 91 may be a screw having a washer or locking element or other hardware to secure the spacer or fastener 91. Fastener 91 may also be a spacer 81 or a portion of fastener 91 may include spacer 81. In one aspect gap 80 has a width equal to the horizontal distance of path 71, as measured from terminal end 73 to a center line of the widened portion. In one aspect, an inside surface of lid 50, at third portion 57 will abut (or in some cases nearly abut) outside surface of wall 30 at third side 37, while slot 70 aligns with pin 31, and as lid 50 is placed on wall such that pin 31 travels into widened portion 72 and along the curve of path 71, the inside surface of lid 50 separates from outside surface of third portion 57 to create gap 80. When pin 31 bottoms out against terminal end 73, gap 80 is set and ready to receive spacer 81. In aspects, gap 80 need not be set when pin abuts terminal end 73, such as when the lid 50 contacts fourth side 38 or fifth side 39 to stop further movement of lid 50 along wall 30. In aspects, inside surface of lid 50 need not contact wall 30 before pin 31 is introduced into slot 70. In some instances the size of gap 80 is configured such that spacer 81 must be fully removed from gap 80 in order for lid 50 to travel in the direction opposite Arrow A so that pin 31 also travels sufficiently along slot 70 for pin to obtain clearance and be removed from slot 70. In other aspects spacer 81 may be less than fully retracted from gap 80 to allow sufficient clearance for movement of lid 50 in the opposite direction so that pins 31, 33 have clearance to slide along slots 70 and allow lid 50 to release upward from wall 30. In aspects one-and-only-one spacer 81 or fastener 91 is positioned at gap 80 such that the lid 50 is removable from the wall 30 only upon adjustment of the single fastener 91, which allows the lid to slide and release from the wall. Such single point adjustment for securing the lid provides ease of operation while accommodating secure locking of the lid 50. No longer is it necessary to insert several screws through the lid to confidently secure the lid into position. In aspects the fastener 91 and/or spacer 81 inserts through a portion of the panel 34 of the lid and abuts against wall 30. In further aspects the fastener 91 and/or spacer 81 inserts into wall 30. In yet further aspects the fastener and/or spacer is positioned within a dimple 92 formed at or into wall 30 (See FIGS. 19, 20). In other aspects fastener and/or spacer may also insert through wall 30.

In a further aspect, spacer 81 may be a material configured to friction-fit within gap 80. Spacer 81 may include a rubberized or foam or plastic or yielding material which can be inserted upward into gap 80 to seal the gap and lock lid 50 into position. The spacer 81 may span a portion or an entirety of the length of gap 80. Spacer 81 may be a sphere or other-shaped item which plugs into gap 80 (and need not necessarily pass through lid 30). The spacer 81 may include a tab or string or handle so that an operator may easily pull downward on the spacer 81 to clear the gap 80 and allow for removal of lid 50. In this manner, an installer may also secure lid 50 to wall 30 without the use of tools or hardware in cases where pins 31, 33 are already present on wall 30. In other aspects, an installer need only secure pins 31, 33 into position (or the pins 31, 33 come pre-installed) and utilize a friction-fit spacer 81 (or fastening spacer 81) for easy installation and use. Such features dramatically reduce the time and steps needed to install a junction box. The junction box 20 is also protective of the housing 40 from the environment. In further aspects, and in situations where a tool 90 is not required to open or remove lid 50 from wall 30, junction box 20 may also include a dead front element positioned at the top opening 42 to prevent accidental insertion of a hand or object within housing 40. In one aspect the dead front includes a panel or plate positioned at the top opening, and which panel may be selectively removed and replaced. In one aspect the dead front includes a polycarbonate panel which must be removed to access the housing 40.

In aspects the junction box 20 includes a three-point connecting system to secure the lid 50 to the wall 30, where two of the three-point connecting elements include pins 31, 33 connecting to the lid at opposite sides 35, 36 of the box 20 and a third connecting element which includes a fastener connecting to the lid 50 at a side 37 of the wall 30 spanning between the opposite sides 35, 36 of the junction box 20.

In further aspects the junction box 20 includes one and only one moving fastener 91 (or spacer 81) configured to lock the lid 50 to the wall 30 such that lid 50 is unable to move upon wall 30 unless the moving fastener 91 (or spacer 81) is adjusted. While junction box 20 may utilize pins 31, 33, in such aspect, pins 31, 33 are stationary.

In one aspect pin 31 is connected to or at first side 35 and a second pin 33 is connected to or at a second side 36 of wall 30. Pins 31, 33 may be connected to the outer surface of the wall 30 or may extend through the wall 30. In one aspect pin 31 includes a head 34 connected to a shank 62 positioned at an outside of the wall 30, and a nut 64 or fastener connected to the pin 31 at an inside of the wall 30. In one aspect shank 62 includes a threaded portion to receive the nut to secure the pin 31 to wall 30. In one aspect pin 31 is a shoulder bolt which may or may not include threads. Pin 31 may comprise other fasteners. Head 34 of pin 31, 33 retains lid upon wall 30.

Figure 6:
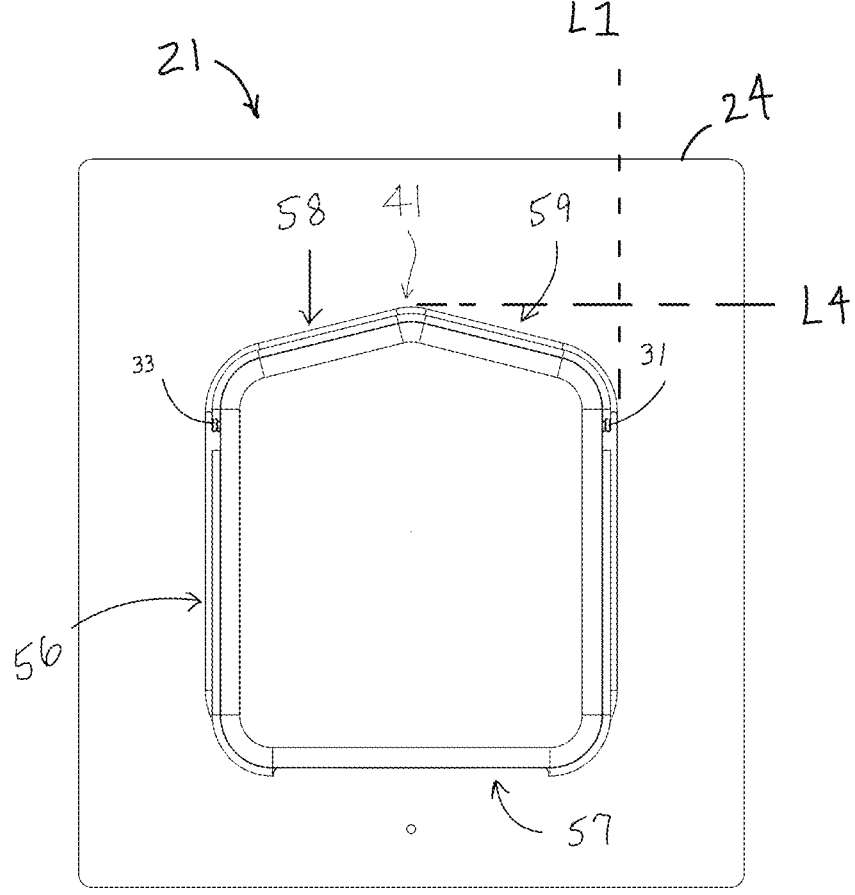
FIG. 6 is a top view of the junction box of FIG. 1.
Figure 7:
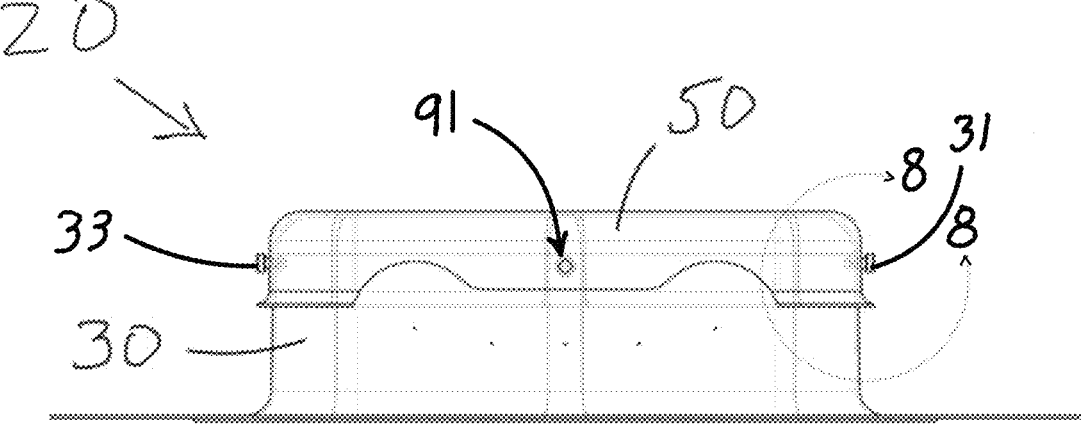
FIG. 7 is a front view of the junction box of FIG. 1.
Figure 8:
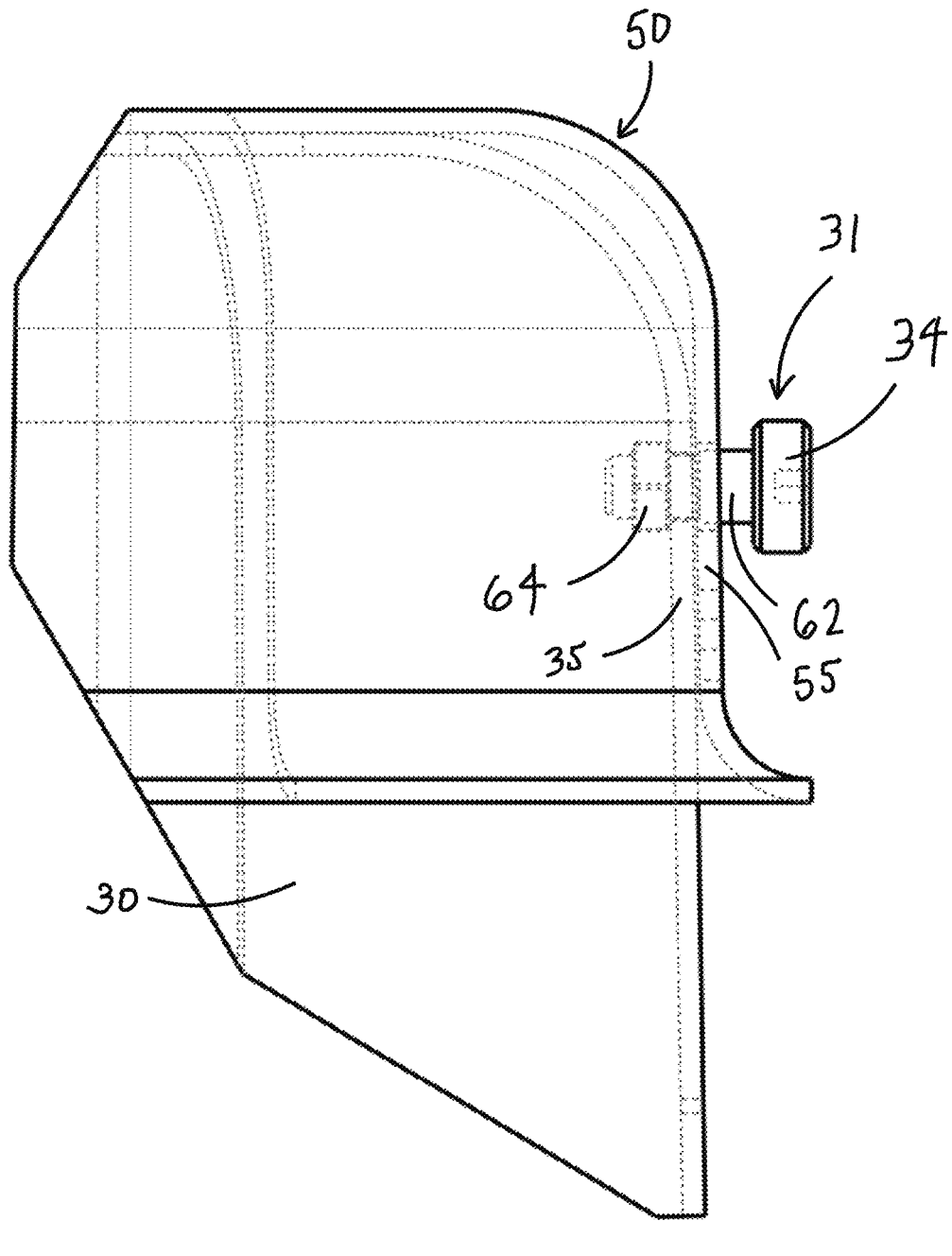
FIG. 8 is a section view taken along line 8-8 of FIG. 7.

FIG. 6 is a top view of junction box 20 and shows pins 31, 33 extending outward from wall 30, and FIG. 7 is a front view also showing pins 31, 33. FIG. 8 is a partial view of junction box 20 with portions removed for clarity. Pin 31 includes a head 34 connected to a shank 62. In one aspect the pin 31 passes through the first side 35 of wall 30 where it is secured by nut 64. In aspects shank 62 is threaded and receives a threaded nut 64 to secure pin 31 to the wall 30. Additional or alternative hardware may be used to secure pin 31 such that pin 31 extends outward from wall 30. Pin 31 may also be welded or riveted into position. A portion of the shank 62 between the head 34 and nut 64 receives or inserts into the slot 70. Head 34 has a size greater than a width of slot 70. As shown in FIG. 8 there is sufficient space between head 34 and nut 64 to receive both first side 35 of wall 30 and first portion 55 of lid 50. Shank 62 may have a length that is longer or shorter, and in some cases has a length such that first side 35 and first portion 55 fit snugly between head 34 and nut 64, although some amount of spacing is desired to accommodate easy removal or replacement of lid 50 onto wall 30.

Figure 9:
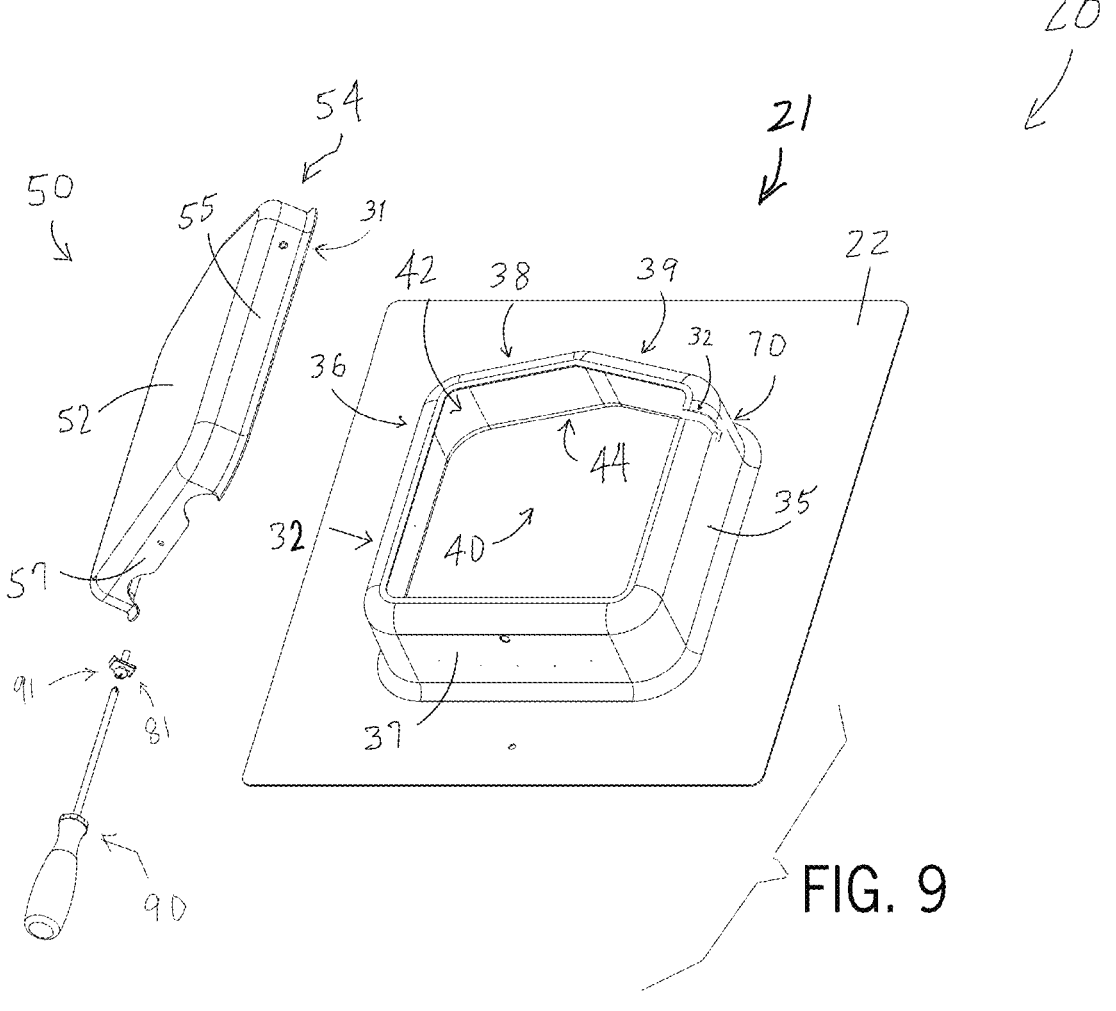
FIG. 9 is an exploded perspective view of a junction box in accordance with a further aspect of the invention.
Figure 10:
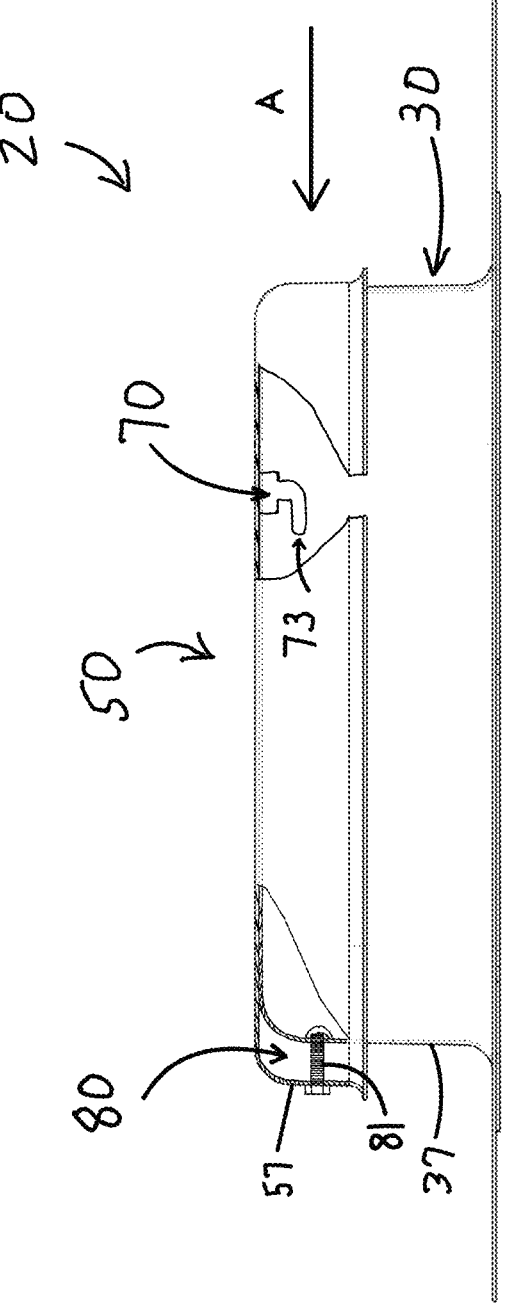
FIG. 10 is a side view of the junction box of FIG. 9 with a portion removed for clarity.

FIG. 9 is an exploded perspective view of a junction box 20 in accordance with a further aspect of the invention. Here, the pins 31, 33 are positioned in the lid 50 while the slots 70 are provided at the wall 30. Particularly, in one aspect slot 70 is formed at first side 35 of wall 30. As shown in FIG. 10, the slot 70 is "J"-shaped such that a wider opening is oriented at an upper area of the path 71 and narrows at the path forming the "J" shape and terminates at a terminal end 73 toward the third side 37 of wall 30. The slot 70 is configured to receive the pin 31 from lid 50. As the pin 31 inserts into slot 70, it is directed downward and translated toward the terminal end 73 in the direction of Arrow A shown in FIG. 10.

Figure 11:
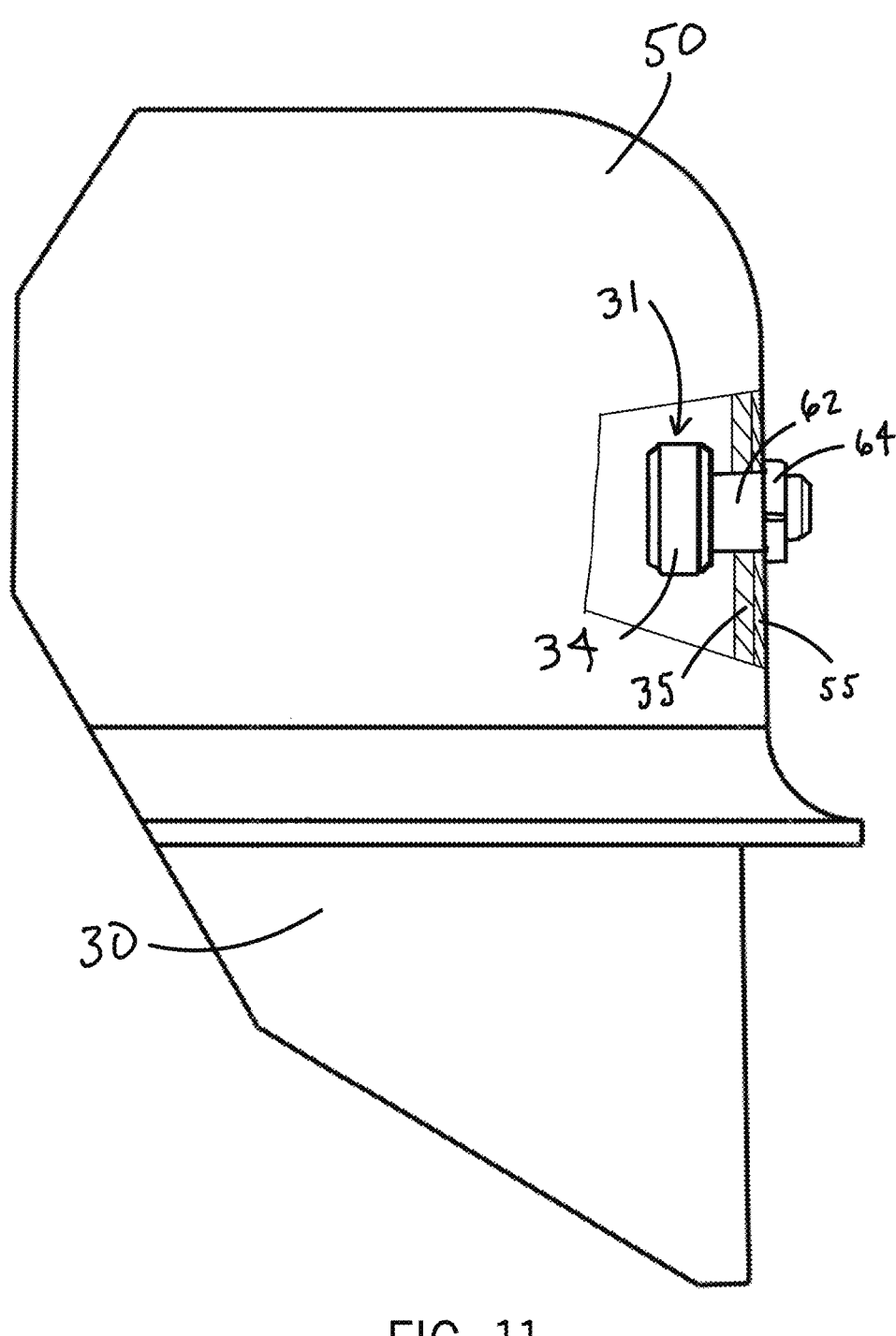
FIG. 11 is a partial front view of the junction box of FIG. 9 with a portion removed for clarity.

FIG. 11 is a partial view of junction box 20 with portions removed for clarity. Pin 31 is secured to lid 50 at an inside area of the lid 50. Particularly, in one aspect pin 31 is positioned so that head 34 is at an inside area of lid 50 while shank 62 passes through slot 70. In aspects a nut 64 positioned at an outside area of lid 50 may secure upon shank 62. In aspects shank 62 is threaded and receives a threaded nut 64. Head 34 is configured to fit through a widened portion 72 of slot 70 while shank 62 moves within the narrowed path 71 of slot 70. Head 34 is unable to fit through the narrowed path 71.

When the pin 31 (which is connected to lid 50) slides within the slot 70 in the direction of Arrow A, the lid 50 is prevented from lifting upward from wall 30. As shown in FIG. 10, when lid 50 slides in the direction of Arrow A along wall 30, the lid 50 is secured into a closed position and defines a gap 80 between a lower portion of lid 50, such as third portion 57, and third side 37 of wall 30. Gap 80 is configured to receive a spacer 81, such as a fastener 91 or other spacer which prevents the lid 50 from sliding in a direction opposite Arrow A. Thus, the lid 50 is fully locked into position upon wall 30.

Figure 12:
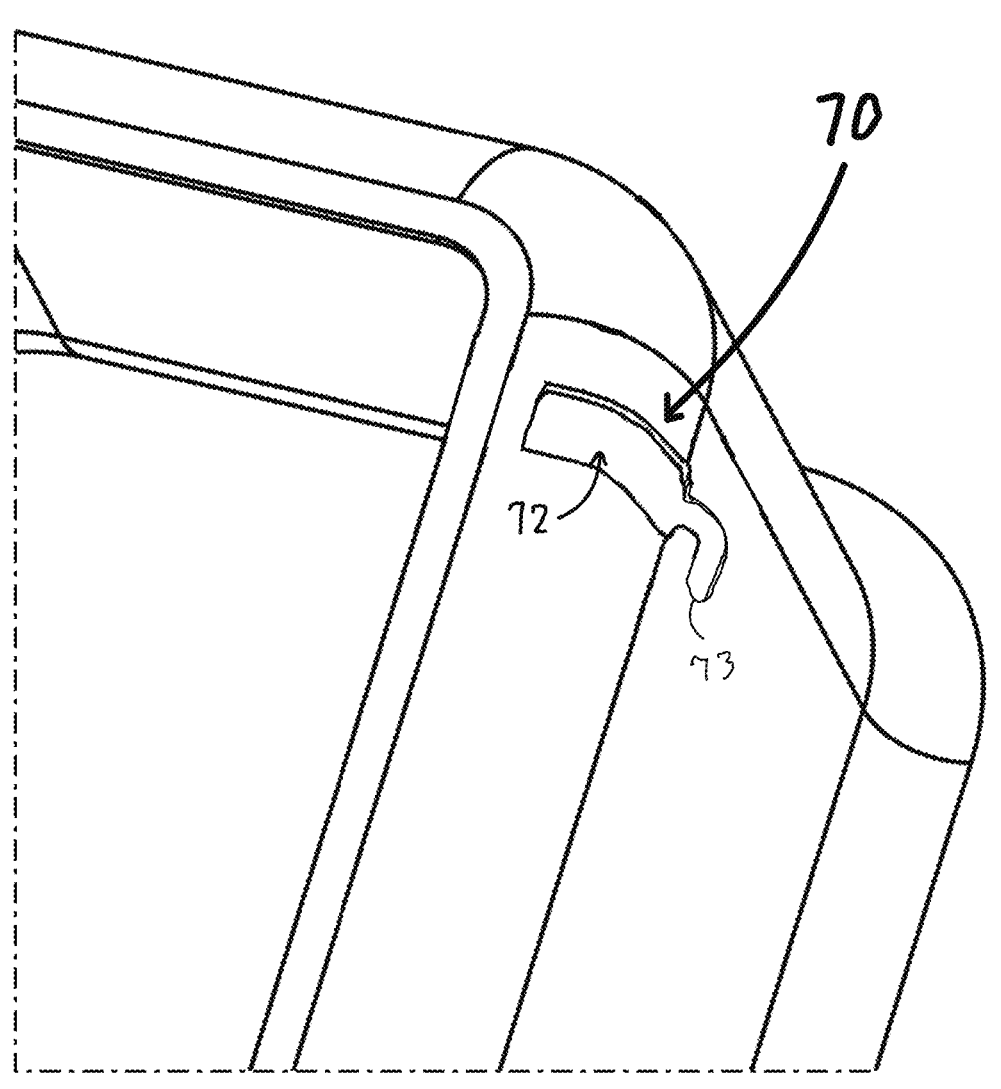
FIG. 12 is a partial perspective view showing an alternative aspect of the junction box of FIG. 9.
Figure 13:
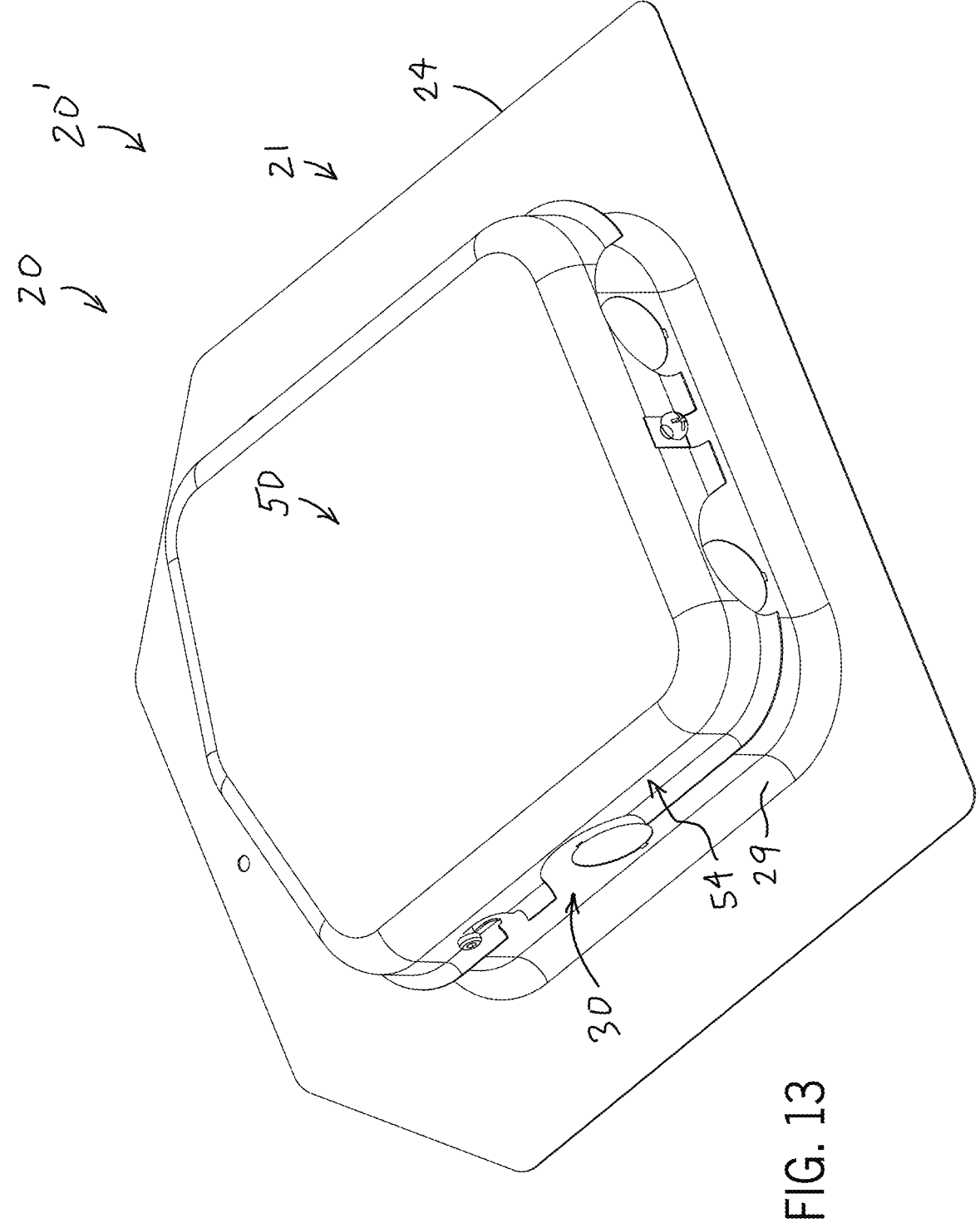
FIG. 13 is a perspective view showing alternative aspects of a junction box and box components in accordance with further aspects of the invention.

In one aspect slot 70 is positioned at wall 30 such that the path 71 extends through the shoulder 32 of wall 30. Shoulder 32 is a rounded aspect of wall 30 which projects toward a central area of housing 40. In one aspect slot 70 originates at a terminal edge of the shoulder toward the central area. In other aspects, as shown in FIG. 12, the slot 70 need not originate at a terminal edge of the shoulder. Widened portion 72 of slot 70 allows for clearance of head 34 to pass into slot 70 while the shank 62 is small enough to pass into the narrower portion of the slot 70 and travel to the terminal end 73. It may be appreciated that junction box 20 shown in FIG. 9 may have two slots 70, one as shown at first side 35 of wall 30 and another at second side 36 of wall 30. The slot 70 at the second side 36 of wall may be similar to the slot 70 as shown in FIG. 12 positioned in part at the shoulder 32 and traveling downward in the J-shaped path to the second side 36.

In further aspect the invention includes a method of securing a lid 50 to a wall 30 where the wall 30 extends upward from a base 22, the wall 30 defining a housing 40 having a top opening 42. The lid has a top portion 52 and a panel 54 extending downwardly from the top portion 52. The lid is sized to fit over the top opening 42 while the panel 54 covers at least a part of an outer surface of the wall 30. As shown in aspects the panel 54 covers an outer surface of the wall 30 around an entire perimeter of the wall 30. The method further comprises a step of sliding the lid 50 in a first direction, such as in the direction of Arrow A, along wall 30 to secure the lid 50 into a closed position upon the wall 30. In the closed positioned the wall 30 and lid 50 define a gap 50. The method further comprising a step of placing a spacer in the gap 80 which prevents the lid 50 from sliding the direction opposite Arrow A. In one aspect the step of placing a spacer in the gap 80 includes inserting a fastener into the lid 50 and in contact with the wall 30. In one aspect the step of placing a spacer in the gap 80 includes utilizing a screwdriver to insert a screw into the lid 50, through the gap 80 and into the wall 30 while pins 31, 33 are positioned within slots 70 and against terminal ends 73.

In further aspects the invention includes a method of using a junction box 20 including positioning a lid 50 upon a wall 30, the lid 50 having a top portion 52 and a panel 54 extending downwardly therefrom and covering at least a part of the outer surface of the wall 30, the wall 30 extending upward from a base 22 and defining a cavity having a top opening 42, and sliding the lid 50 along the wall 30 toward a lower portion of the panel 54 to define a gap 80 between the lower portion of the panel 54 and the wall 30. In further aspect the method includes placing a spacer 81 into the gap 80. In further aspects the method includes the base 22 extending outward from the wall 30 in all directions along a common plane, the junction box 20 including a bottom 45 in part defining the cavity.

Figure 14:
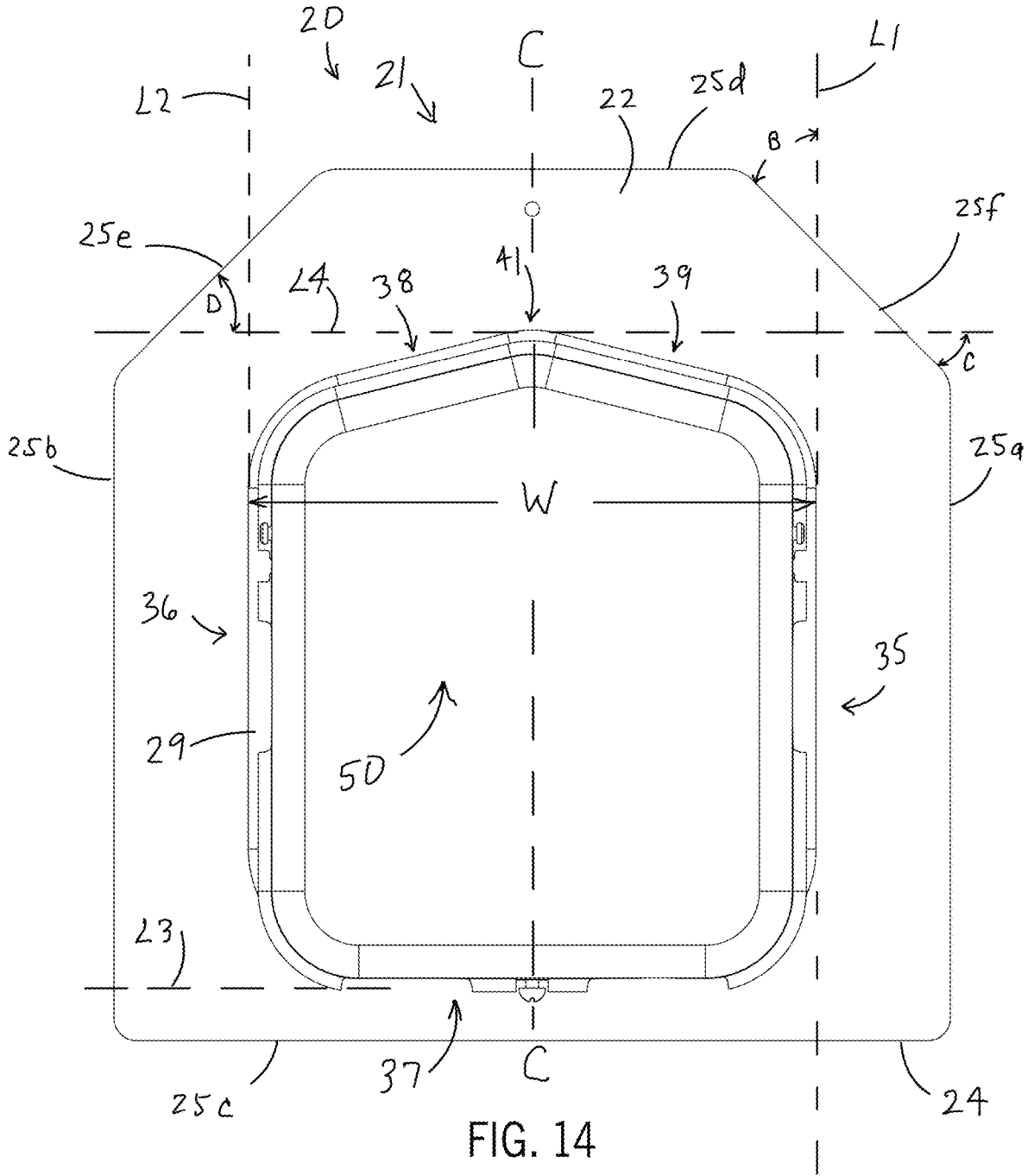
FIG. 14 is a top view of the junction box and component of FIG. 13.

In further aspects the invention includes a junction box 20, 20' and box component 21 and lid 50 as shown in FIG. 13 through FIG. 22. It will be appreciated that junction box 20' includes features as described above with respect to junction box 20. In one aspect, box component 21 includes a base extending from wall 30 where the base (sometimes referred to as flashing) extends outward from the wall 30 and defines special corners (or lack of corners) to accommodate ease of installation and lessening harm to shingles and the structure to which junction box 20 is installed. FIG. 14 shows junction box 20 where base 20 defines a base perimeter 24. Base 22 is planar or substantially planar and base perimeter 24 extending around the base 22. Wall 30 extends upward from base 22 and includes sides 35-39 as referenced previously. The side walls 35-39 define the housing 40 having a top opening 42. The base 22 is configured to be covered by lid 50. As shown in FIG. 14, first side wall 35 defines a first wall reference line L1. At least a portion of base perimeter 24 (for instance linear segment 25f) crosses the first wall reference line L1 at an angle other than 90 degrees. Compare this with the base perimeter 24 of FIG. 6 which crosses the reference line at a perpendicular angle (and which does not include the desired narrowed profile of the currently described aspect of FIG. 14). For instance, upper corners 26, defined by segments 25e, 25f, are lacking in FIG. 6. Having the portion of the base perimeter cross the first wall reference line L1 at an angle other than 90 degrees accommodates a narrower profile device 20, 20' having the advantages explained above. As shown in FIG. 14, a similar feature is shown at the left side of the drawing and with respect to reference line L2 and linear segment 25e.

The first wall reference line L1 in one aspect runs along a linear component of the first side wall 35. It may be appreciated that in cases where wall 30 includes a non-linear aspect, the reference line L1 corresponds to the outermost point of the non-linear aspect. For instance, if the wall is curved or circular or a mix of linear and curved orientations, the reference line L1 will align along an outermost aspect of the wall 30 (away from the opening of the housing) in a vertical orientation. In aspects reference line L1 and L2 may be oriented vertically while reference line L3 and L4 (associated with third side 37 and fourth and/or fifth side 38, 39) may be oriented horizontally, i.e., on an x-y coordinate system, with linear segment 25c (and third side wall 37) also oriented horizontally. It may be appreciated in aspects that linear segment 25d is oriented horizontally, while linear segments 25a, 25b are oriented vertically. In one aspect, the portion of the base perimeter (at line segment 25f, for instance) crosses the first wall reference line L1 at an angle B. In one aspect angle B is 45 degrees. It may be appreciated that angle B may be other than 45 degrees. In aspects, angle B may be between 35 and 55 degrees, where applicant has found such range to accommodate a desired and sufficiently narrowed profile to allow ease of insert of the box component 21 under shingles. In a further aspect line segment 25e crosses the second wall reference line L2 (which is defined by second side wall 36) at an angle other than 90 degrees, for instance at the upper angle between Line L2 and linear segment 25e; where in one aspect the angle is 45 degrees. It may be appreciated that the angle may be other than 45 degrees. In aspects, angle B may be between 35 and 55 degrees as noted above. In aspects linear segments 25a and 25b are oriented in a spaced relationship from, and lay parallel with, the respective side walls 35, 36. It may be appreciated that segments 25a, 25b may also lie other than parallel the respective side walls 35, 36. It may also be appreciated that perimeter segments 25 may be other than linear segments and still accommodate a narrower profile to assist insertion of base 22 under shingles. In further aspects, segments 25 are not necessarily linear segments and may nonetheless cross the reference lines at other than 90 degrees.

In a further aspect, third side wall 37 may be perpendicular side walls 35, 36 and defines a third wall reference line L3. At least another side wall, such as fourth wall 38 and/or 39 in part defines a peak reference line L4 which is parallel third wall reference line L3. At least a portion of the base perimeter, such as at 25f and/or 25e crosses the peak reference line L4 at an angle other than 90 degrees. See for instance angle C and angle D. These linear segments 25 may cross the peak reference lines at an angle of 45 degrees. In one aspect side walls 38, 39 define a peak, and peak reference line L4 is defined in part by the peak 41, where the peak 41 is a portion of the wall 30 positioned furthest from third side wall 37. In aspects, third linear segment L3 may align with the third side wall 37, i.e., in a case where the base does not extend beyond the third side wall in an alternative aspect. It may be appreciated that base 22 may also include a bottom 45, whether integrally connected or connected as noted above. Junction box 20, 20' may also be made of metal or of plastic as noted above.

In further reference to FIG. 14, segments 25 connect to each other via curved portions of the base perimeter 24. For instance, perimeter segments 25 may be linear segments which connect to respective adjacent linear segments at portions of the base perimeter 24 having a radius or a curved portion. Corners of base 22, for instance where segment 25c connects to segment 25a or 25b, may also be sharp perpendicular corners or preferably the segments meet at a radius. Base perimeter 24 may also include a radius where other segments 25 meet. FIG. 14 also shows wall 30 defining a maximum width "W" between the first side wall 35 and the second side wall 36. The fourth segment 25d, which may be linear, has a length less than the maximum width W.

In one aspect, junction box 20, 20' has dimensions approximately 13"×12"×3" in the case of a smaller implementation. More particularly, junction box 20, 20' may have a length of 13.15 inches, width of 12 inches and thickness of 2.72 inches. In one case where junction box has a width of 12 inches, segment 25f has a length of 6 inches or less (with the upper corners 26 spanning inward 3 inches from respective segments 25a, 25b). In one aspect a thickness of base 22 may be 0.02 inches (not including a thickness of bottom 45). Other thicknesses may also be used. In a case where segments 25e, 25f are linear and are oriented at 45 degrees with respect to line segments 25a, 25b, the segments 25e, 25f have a slope of +1, −1. It may be appreciated that greater (or lesser) slopes may be utilized for segments 25e, 25f. It may It may also be appreciated that segments 25e, 25 to not necessarily have to have the same slope (or the same negative slope; for instance, one of the segments 25e may have a slope of +1.1, while segment 25f has slope −1). In aspects, the narrowing of the base 22 (i.e. slant of upper corners 26) above the wall 30 need not be symmetrical. It may be appreciated that angled corners 26 narrow toward centerline "C" which passes through base 22 as shown in FIG. 14.

FIG. 15 is a side view of junction box 20, 20' and shows lid 50 having a grommet well 65 positioned between widened portion 72 and spacer/fastener 91. A preset knockout 46 is located at wall 30 of box component 21. In a case where the knockout 46 is removed, a cable is inserted into the junction box and sealed with a grommet or other equipment. In some cases the grommet will be positioned about the perimeter of the opening which remains after knockout 46 is removed. The grommet well 65 provides spacing for lid 50 to clear a cable or grommet which may be present. A spacing is defined between knockout 46 and grommet well 65 at reference position 67. It may be appreciated that reference position 67 is located at or near knockout 46 or a grommet or cable when lid 50 is initially introduced upon wall 30 so that pin 33 aligns with widened portion 72. This spacing at reference position 67 accommodates insertion of the lid onto the wall 30 which lid is subsequently slide or translated along the wall in direction of arrow A. When the lid 50 is locked by use of spacer 91, the grommet well 65 forms a uniform spacing with respect to knockout 46. A knockout 46 and accompanying grommet well 65 may also be provided on the opposite side of panel 54 adjacent pin 31. In one aspect grommet well 65 is curved, although other shapes may be contemplated. In one aspect of a smaller profile junction box the grommet well 65 has a radius measure of 2.0 inches, and knockout 46 has a radius measure of about 1 inch or 1.098 inches. In further aspects, curved footer 29, where wall 30 meets base 22 (or where base 22 transitions to the wall 30; See FIG. 2, FIG. 13, FIG. 14), has a radius measure of 0.38 inches. In one aspect a distance from perimeter segment 25b to the beginning of the curved footer 29 at second side 36 is 1.93 inches (FIG. 14).

Figures 16, 17, 18:
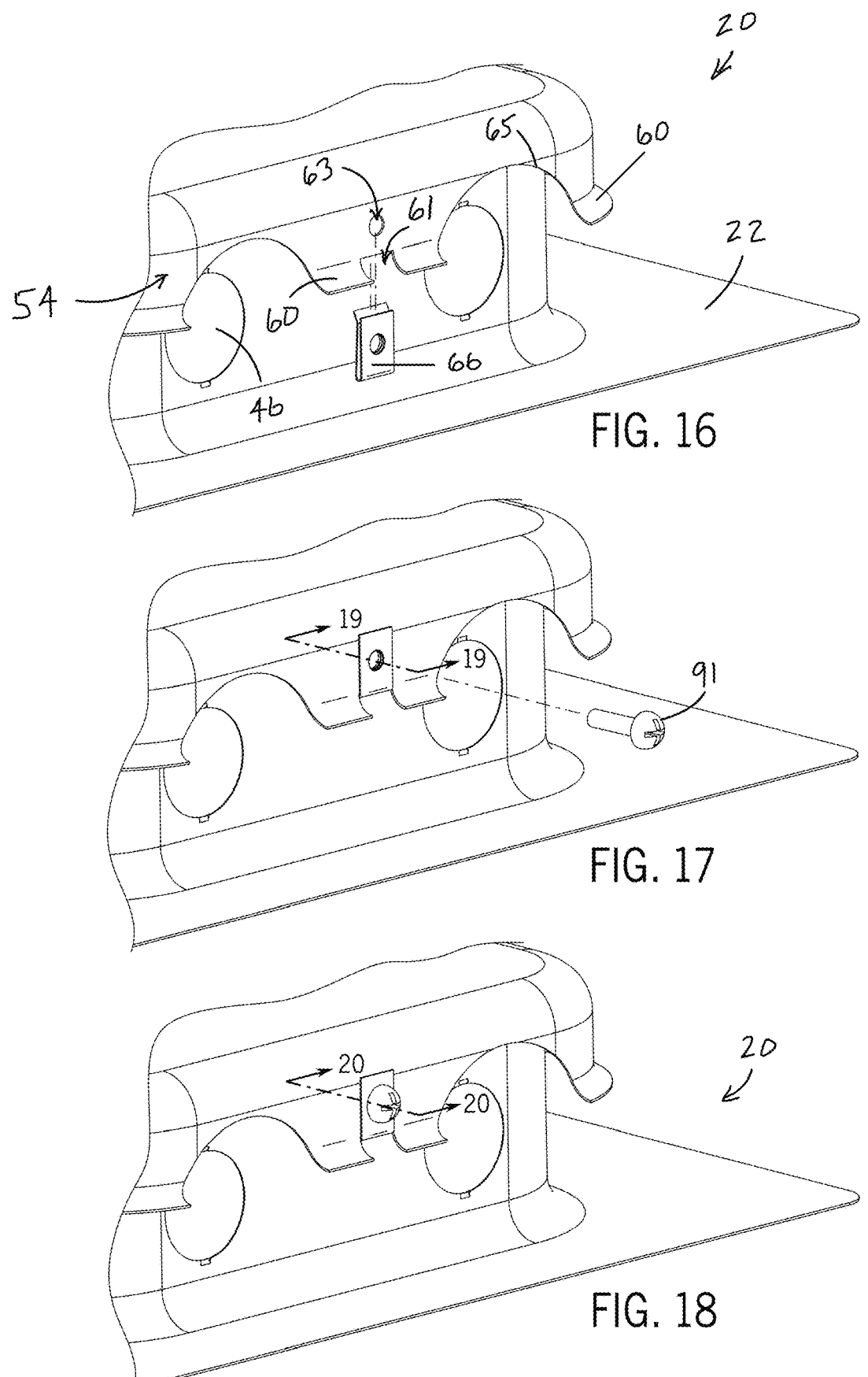
FIGS. 16-18 are partial exploded front perspective views of the junction box and components of FIG. 13.
Figure 21:
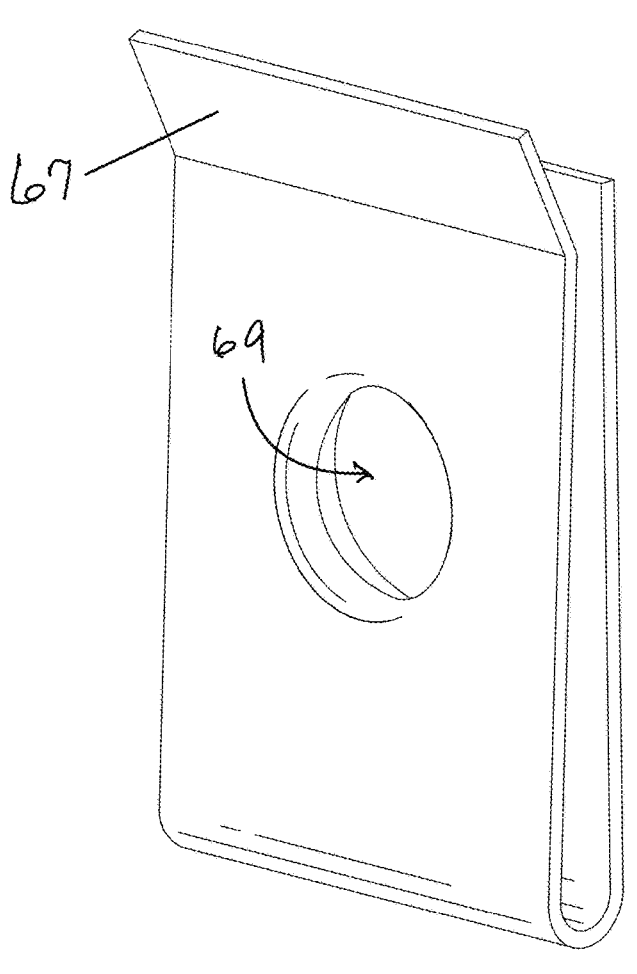
FIG. 21 is a perspective view of a component for use in conjunction with the invention.
Figure 21:
Figure 22:
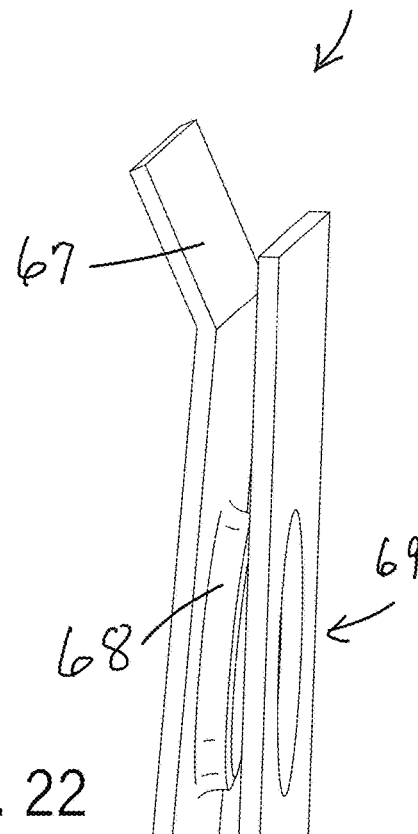
FIG. 22 is a further perspective view of the component of FIG. 21.

FIG. 15 through FIG. 22 show further aspects of the invention. FIG. 15 shows lid 50 having a perimeter edge in the form of a flared or tapered edge or rib 60 which lends structural strength to the lid 50, a gradually sloped component for a user to grasp, and promotes dissipation of precipitation outward from the box component 21. The rib 60 increases the structural strength of lid 50 in providing stability against a greater variety of forces compared to structures without such angles presented by rib 60. The rib 60 is located at a terminal portion of panel 54 which extends downward from a top portion 52 of the lid 50 and aligns substantially around the entire perimeter of the downward extending panel 54. In further aspects the rib 60 includes or defines rib gaps 61 or spaces to accommodate insertion and removal of hardware and increases the strength of the lid 50 at key areas of use, and such rib gaps 61 operate as receiving ports for ease of use and assembly of the junction box. FIG. 16 shows rib 60, or a pair of ribs 60 defining a rib gap 61. Rib gap 61 accommodates insertion of a spring clip 66 onto the lid 50 at panel 54. The rib gap 61 allows for a clearance to a planar dimension of the panel 54 so that spring clip 66 may be easily inserted upward onto panel 54 and between ribs 66 for further support and protection of the clip 66 and fastener/spacer 91. A port 63 is provided at panel 54 of lid 50 to receive the fastener/spacer 91. FIG. 17 shows spacer 91 in exploded view and to be inserted into port 63. FIG. 18 shows spacer 91 fully inserted into lid 50 and abutting spring clip 66. FIG. 19 is a partial section view of junction box 20 taken along line 19-19 of FIG. 17, and shows clip 66 inserted at port 63. FIG. 20 is a partial section view of junction box 20 taken along line 20-20 of FIG. 18 and shows fastener 91 inserted into the clip 66 and with spacer 81 abutting a depression or dimple 92 defined by wall 30. In one instance fastener 91 is a threaded fastener with threads mating against corresponding thread structures of the clip 66 and/or panel 54. FIG. 21 and FIG. 22 are perspective views of clip 66 showing clip 66 bent or formed into position having generally planar and opposing panels configured to abut against opposing sides of panel 54. A taper 67 allows for easier grasping of clip 66 and a wider mouth or opening for ease of insertion and upward sliding of the clip 66 onto the edge of lid 50. Clip 66 includes a depression 68 formed about or adjacent hole 69, which hole 69 is defined by or passes through the opposing panels of clip 66 to allow fastener 91 to pass. Depression 68 together with edges forming holes 69 mate with threads of fastener 91 to form a threaded structure to receive and secure fastener 91 into position by twisting or adjusting the fastener with a screwdriver or other tools. The panel portion of clip 66 having the taper 67 abuts against an insider surface of lid 50 with the depression 68 configured to insert into the port 63 (from an inside-out orientation). The depression 68 assists in aligning and securing clip 66 into position and from falling off lid 50 during assembly or when fastener 91 is not present. Clip 66 may also be formed as a folded spring to have resilience to also friction fit into position upon lid 50. It may be appreciated that spacer 91 projects toward the wall 30 such that retracting the spacer (i.e., by unscrewing the fastener with a screwdriver or other tool) accommodates sliding the lid 50 along the wall 30 in a direction opposite the spacer 81. The spacer 81 may be retracted a sufficient distance to allow the lid to slide a sufficient distance along wall 30 such that pins 31, 33 slide within respective slots and exit those slots to detach the lid 50 from the box component 21. Fastener 91 need not be removed from lid 50 to accommodate detachment of the lid 50 from the box component 21. It may be appreciated that junction box 20, 20' may be assembled by a user without adding any hardware or screws or bolts or drilling any holes, and the user may simply lock and unlock (and remove and replace or reinsert) the lid 50 using a single-point adjustment means for such locking and unlocking of the lid 50.

In further aspects the invention includes a method for selectively locking and detaching a lid 50 to a box component 21 of a junction box 20 having a base 22 and a wall 30 extending upward from the base 22 and defining a housing 40 having a top opening 42, the base 22 extending outward from the wall 30, the method including steps of placing the lid on the base component, sliding the lid in a direction of a fastener or spacer positioned a gap between the lid 50 and the wall 30, and adjusting the fastener to lock the lid to the box compartment 21. The method may further include steps of adjusting the fastener outward from the lid and then sliding the lid in a direction opposite the fastener to allows the lid to detach from the box component.

It should be understood, of course, that the foregoing relates to exemplary embodiments of the invention and that modifications may be made without departing from the spirit and scope of the invention as set forth in the following claims.

I claim:

1. A box component for a junction box, the box component comprising:

a base;

a wall extending upward from the base, the wall having a first linear side wall, a second linear side wall, a third side wall and at least another side wall defining a housing having a top opening configured to be covered by a lid of the junction box, the base extending outward from the wall and defining a base perimeter having at least a first linear perimeter segment parallel the first linear side wall, the first linear side wall defining a first vertical reference line, at least a portion of the base perimeter crossing the first reference line at an angle other than 90 degrees.

2. The box component of claim 1 where the at least a portion of the base perimeter crosses the first reference line at an angle of 45 degrees.

3. The box component of claim 1 where the base perimeter has a second linear perimeter segment parallel the second linear side wall, the second linear side wall defining a second vertical reference line, at least a portion of the base perimeter crossing the second reference line at an angle other than 90 degrees.

4. The box component of claim 1 where the third side wall is perpendicular the first and second side walls and defines a third horizontal reference line, the at least another side wall in part defining a peak reference line parallel the third reference line, at least a portion of the base perimeter crossing the peak reference line at an angle other than 90 degrees.

5. The box component of claim 4 where the at least another side wall and a further side wall define a peak being a furthermost point from the third reference line, the peak reference line defined at least in part by the peak.

6. A box component for a junction box, the box component comprising:

a base;

a wall extending upward from the base, the wall having a first side wall, a second side wall, a third side wall and at least another side wall defining a housing having a top opening configured to be covered by a lid of the junction box, the base extending outward from the wall and defining a base perimeter, the third side wall defining a third wall reference line, the at least another side wall in part defining a peak reference line parallel the third wall reference line, at least a portion of the base perimeter crossing the peak reference line at an angle other than 90 degrees.

7. The box component of claim 6 where the at least another side wall and a further side wall form a peak, the peak reference line defined in part by the peak, the peak being a portion of the wall positioned furthest from the third side wall.

8. The box component of claim 7 where the base perimeter crosses the peak reference line again at an angle other than 90 degrees.

9. The box component of claim 6 where the base perimeter crosses the peak reference line at an angle of 45 degrees.

10. The box component of claim 6 where the base perimeter includes a first linear segment, a second linear segment, a third linear segment, a fourth linear segment, a fifth linear segment and a sixth linear segment, the fifth and sixth linear segments being other than perpendicular and other than parallel the first linear segment, the second linear segment, the third linear segment and the fourth linear segment.

11. The box component of claim 10 where the third linear segment is oriented in a spaced relationship from the third side wall.

12. The box component of claim 6 where the base includes a bottom positioned opposite the top opening.

13. The box component of claim 6 where the component is made of metal or plastic.

14. The box component of claim 6 wherein the third side wall is perpendicular to the first and second side walls.

15. A box component for a junction box, the box component comprising:

a base;

a wall extending upward from the base and defining a housing having a top opening configured to be covered by a lid of the junction box, the base extending outward from the wall and defining a base perimeter having at least a first linear perimeter segment, a second linear perimeter segment, a third linear perimeter segment, a fourth linear perimeter segment, a fifth linear perimeter segment and a sixth perimeter segment.

16. The box component of claim 15 where the perimeter segments connect to adjacent segments via curved portions of the base perimeter.

17. The box component of claim 16 where the perimeter segments are linear segments.

18. The box component of claim 17 where the first linear segment is oriented opposite and parallel the second linear segment and the third linear segment is oriented opposite and parallel the fourth linear segment, and the fifth linear segment is oriented other than parallel the sixth linear segment.

19. The box component of claim 17 where the fifth linear segment is oriented at a first slope and the sixth linear segment is oriented at a negative of the first slope.

20. The box component of claim 17 where the fifth linear segment and the sixth linear segment are oriented at a 45 degree angle with respect the third linear segment.

21. The box component of claim 17 where the wall defines a maximum width between a first side wall and an opposite second side wall, the fourth linear segment positioned opposite the third linear segment and having a length less than the maximum width.

22. The box component of claim 15 where the wall extending upward has a first linear side wall, a second linear side wall, a third linear side wall and at least another side wall.

23. The box component of claim 15 where the wall extending upward is circular.

24. The box component of claim 15 where the wall extending upward includes curved surfaces.

25. A box component for a junction box, the box component comprising:
a base;
a wall extending upward from the base and defining a housing having a top opening configured to be covered by a lid of the junction box, the base extending outward from the wall and defining a base perimeter having a lower linear segment and two side linear segments perpendicular the lower linear segment, an upper linear segment opposite and parallel the lower linear segment, the upper linear segment having a total length shorter than a total length of the lower linear segment, and first and second upper corners defined by linear segments angled between the upper linear segment and the respective side linear segments.

26. The box component of claim 25 where the angled linear segments are angled at 45 degrees with respect the lower linear segment.

27. The box component of claim 25 where the angled linear segments are angled at between 35 and 55 degrees with respect the lower linear segment.

28. The box component of claim 25 where the angled linear segments connect to respective adjacent linear segments at portions of the base perimeter having a radius.

29. A junction box comprising a lid secured to and covering the top opening of the box component of claim 25.

* * * * *